United States Patent [19]

Doyle et al.

[11] 4,439,661

[45] Mar. 27, 1984

[54] APPARATUS AND METHOD FOR DOUBLE END STUD WELDING

[75] Inventors: Thomas E. Doyle; Daniel Hauser, both of Columbus; David C. Martin, Worthington, all of Ohio; Michael D. Hayes, Minas Gerais, Brazil

[73] Assignee: KSM Fastening Systems Inc., Moorestown, N.J.

[21] Appl. No.: 265,239

[22] Filed: May 19, 1981

Related U.S. Application Data

[63] Continuation-in-part of Ser. No. 95,322, Nov. 19, 1979, Pat. No. 4,339,653.

[30] Foreign Application Priority Data

Nov. 18, 1980 [CA] Canada .................................. 364898

[51] Int. Cl.³ .............................................. B23K 9/20
[52] U.S. Cl. ....................................... 219/99; 52/334; 219/98; 411/460
[58] Field of Search .................... 219/98, 99; 411/457, 411/458, 459, 460; 52/334

[56] References Cited

U.S. PATENT DOCUMENTS

| | | | |
|---|---|---|---|
| 1,983,373 | 12/1934 | Horton | 411/457 |
| 2,349,547 | 5/1944 | Gisondi | 411/457 X |
| 2,553,499 | 5/1951 | Graham | 219/99 |
| 2,897,391 | 7/1959 | Erskine | 219/107 |
| 3,086,208 | 4/1963 | Eby | 411/457 X |
| 4,339,653 | 7/1982 | Doyle | 219/99 |

FOREIGN PATENT DOCUMENTS

| | | | |
|---|---|---|---|
| 828255 | 1/1952 | Fed. Rep. of Germany | 52/334 |
| 230091 | 12/1943 | Switzerland | 411/457 |

Primary Examiner—B. A. Reynolds
Assistant Examiner—Alfred S. Keve
Attorney, Agent, or Firm—Duffield & Lehrer

[57] ABSTRACT

Method and apparatus for simultaneously welding by the stud end welding technique a stud having two or more ends. The stud includes at least one elongated relatively thin metallic projection from each end of the stud to be welded. The method and apparatus maintains a current density in a given projection sufficient to disintegrate the projection with consequent arc initiation. The resultant arcs melt all stud ends and plate. The molten ends are lowered into the pools at a controlled rate at which time the current is extinguished and the material solidifies.

15 Claims, 4 Drawing Figures

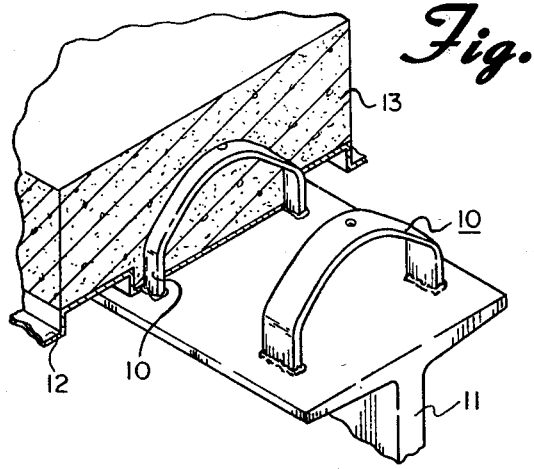
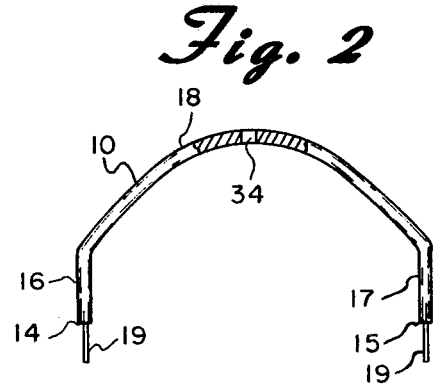
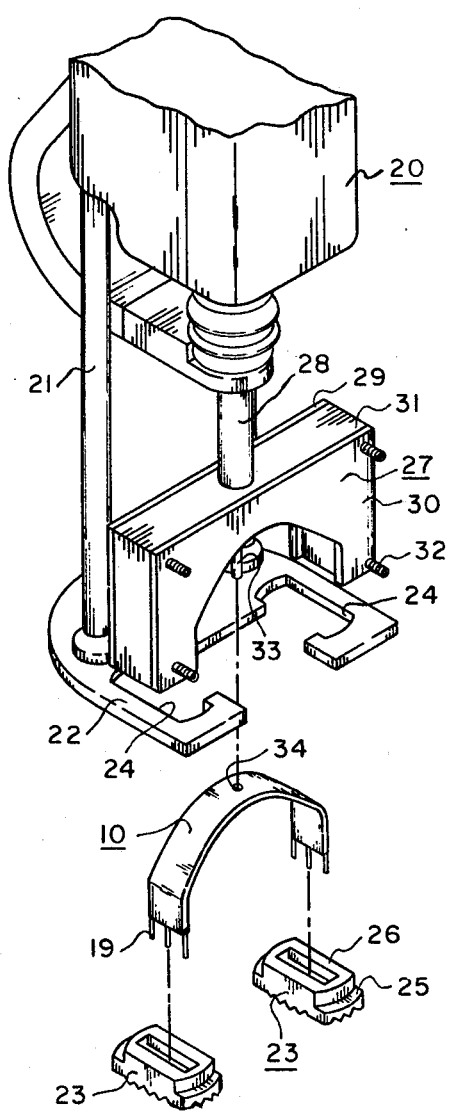
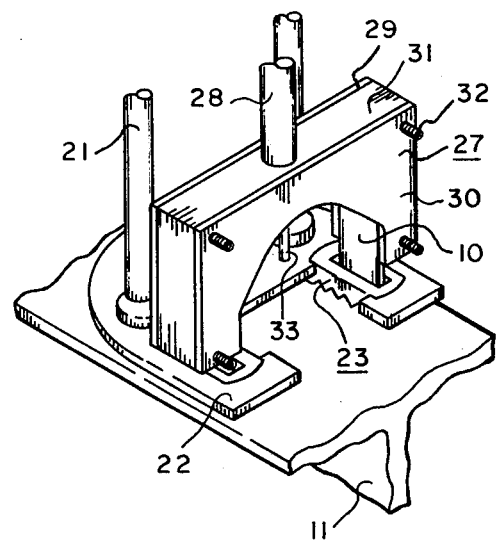

APPARATUS AND METHOD FOR DOUBLE END STUD WELDING

This application is a continuation-in-part of application Ser. No. 06/095,322, filed Nov. 19, 1979 now U.S. Pat. No. 4,339,653, issued July 13, 1982.

FIELD OF INVENTION

The present invention applies to the art of stud welding and more particularly to apparatus and methods for welding studs having two or more ends and to the design of such studs.

BACKGROUND OF INVENTION

The present invention relates to stud welding apparatus and methods and, more particularly, to methods and apparatus for welding, by the stud end welding technique, a stud having a plurality of ends which are to be simultaneously welded to a workpiece.

The stud end welding technique has been known and in practical commercial use for many years. In this welding technique, a single end of a metallic member, such as a threaded bolt or the like, is welded to a metallic member generally known as a base member by the application of sufficiently high current passing through the stud and across an arc between the stud and the workpiece to create a molten pool of metal into which the stud is ultimately plunged and secured following solidification of the molten pool.

There are many variations of this technique. However, the technique is generally divided into two major categories, i.e. drawn arc stud welding and capacitor discharge stud welding. In drawn arc stud welding, current is passed through the stud to be welded while in contact with the workpiece and then lifted to create an arc between the stud and workpiece. After sufficient time passes to permit the arc to create melting of the stud and workpiece, the stud is returned to the workpiece into the molten pool of metal. In this mode of welding, an arc shield is placed around the end of the stud and in contact with the workpiece to contain the molten pool of metal to form a weld fillet following solidification of the metal. This technique is used for larger diameter studs or the conventional shear connectors in ranges generally in excess of ½" of diameter.

The drawn arc stud welding technique generally employs a rounded, square or rectangular configuration on the end of the stud to be welded. The current density passing through the end of the stud being welded is relatively low compared to capacitor discharge welding as will be discussed hereinafter and is generally in the area of approximately 5,000 amps per square inch. The weld time for drawn arc stud welding varies depending on the application and the diameter of the stud but it is generally in the area of approximately 0.5 seconds for an average application for welding of a ½" stud. Thus, drawn arc stud welding is generally considered to be a longer low current welding process with essentially arc creation resulting in melting of the stud and the workpiece with little or no significant instantaneous distintegration of the end of the stud.

The capacitor discharge stud welding technique differs significantly from the drawn arc stud end welding technique in many ways. In capacitor discharge stud welding, the power source is not a continuous power source as in drawn arc stud welding but is a stored energy source such as that from a bank of capacitors which have been charged to a predetermined level before initiation of the welding cycle. Additionally, the studs utilized in capacitor discharge stud welding are usually of a small diameter in the range of ¼" or less and also include a small diameter and length welding tip on the end of the stud. The welding tip serves to space the end of the stud to be welded from the workpiece at the beginning of the welding cycle. Upon initiation of the welding cycle, the readily available energy supply from the energy source such as the capacitors is dumped through the stud at an extremely high current density resulting in complete disintegration and vaporization of the welding tip. The distintegration of the welding tip momentarily leaves the stud spaced from the workpiece while an arc is established between the stud and the workpiece substantially along the entire face of the stud due to the high energy level of the capacitors.

In an average capacitor discharge stud welding environment, the current density passing through the tip of the welding stud is, momentarily, in the range of approximately 10,000,000 amps per square inch. This flash of high density current is substantially instantaneous and the entire weld cycle for an average capacitor discharge welding cycle is approximately 0.003 seconds.

Capacitor discharge welding is used primarily but not restricted to rather small studs, high production rates and with thin sheet base material which cannot withstand the longer welding and heating cycles of drawn arc stud welding. Additionally, the weld strength of a capacitor discharge weld is somewhat less than that of the drawn arc stud welding technique.

The stud end welding technique, either drawn arc stud welding or capacitor discharge stud welding, has not, heretofore, been successfully used in the welding of studs having two or more ends which are required to be welded simultaneously to the base member. There are numerous stud configurations which have two or more ends which are required to be welded and thus cannot utilize the stud end welding technique. Examples of such studs are double ended lifting hooks, handles and hold-down loops all of which must be welded by electric or gas hand welding.

Another major category of stud which includes two or more ends and which must currently be hand welded is the double ended shear connector. A double ended shear connector is a U-shaped metallic member which is welded to an I-beam or the like and is later embedded in concrete lying upon the I-beam to provide a shear interconnection between the concrete slab lying upon the beam and the beam itself.

There are basically two or more types of shear connectors in use in the industry today. One kind is the headed shear connector which is an elongate rod like member having one end weldable thereon and an enlarged flanged head at the opposite end. This stud is generally of round configuration and of approximately ⅜ to ⅞ inches in diameter and is capable of being welded by the conventional drawn arc stud welding technique. Another design of sheat connector conventionally in use is a generally U-shaped member of rectangular cross section of approximately eight gage thickness and 1 inches wide with a height of approximately 3 inches and a separation of the two legs of approximately 4⅜ inches. This class of shear connector may be referred to as the double ended shear connector whereas the single elongate shear connector is generally known as the headed shear connector.

A double ended shear connector of less total metal weight than a headed shear connector can still provide equal or greater shear resistance when welded in place. Thus, the material costs and performance of a double ended shear connector is superior to that of a headed shear connector. However, the double ended shear connector suffers from the disadvantage in that it must be manually welded and has not, heretofore, been capable of being welded by the stud end welding technique. The hand welding technique is more time consuming than the stud end welding technique and, additionally, the skill and time required to manually weld the double ended shear connector is greater than that required of the operator for the stud end welding technique with the further consequent addition of expense in the trade utilized. Accordingly, there is a real industry need for a method and apparatus to weld double ended shear connectors by the stud end welding technique.

Different techniques have, in the past, been attempted to arrive at apparatus and methods to successfully weld multiended studs. The foremost problem encountered with the welding operation of double ended studs is the initiation of an arc on both legs of the stud. If the arc initiates on one leg and nothing is done to enhance initiation on the other leg, the arc will continue to operate on the first leg and the second arc will not be initiated. There are two main reasons for this occurrence. First, the operating arc will cause a large voltage drop from the open circuit voltage. This will make it increasingly difficult to break down the air gap resistance at the unarcing leg. Secondly, the heating of the arcing leg will lower the work function and increase the electron flow at that point, effectively lowering the resistance. These two effects combine to make it extremely difficult to initiate a second arc at the remaining legs once there has been the establishment of a first arc.

The desired solution to this problem of single arc initiation is to initiate arcs on both legs of the stud simultaneously. However, with the conventional stud welding apparatus and method of stud liftoff initiation, it is nearly impossible to maintain equal initial arc gaps. Even a very small difference in gap size works to prevent one arc from starting because the breakdown voltage can be in the order of 1,000 volts/mil. in air. Both legs must leave the base plate surface at exactly the same time or only one arc will occur.

Assuming that dual arcs can be initiated, the second problem encountered is to insure that equal welding takes place on both legs of the stud. Essentially, this means that equal welding currents must be maintained in both legs. Differences in current readily result from such conditions as oxides on the work surface or subtle changes in metal transferred through either arc. Accordingly, it is extremely difficult if not impossible to maintain equal current density in the welding legs and thus, uneven melting occurs with the consequence of one leg of the double ended stud not being sufficiently welded.

One attempt made at solving the problem of establishing and regulating arcing between the two legs of a double ended stud was to place an insulator between the two legs and apply separate current sources to the welding legs. Such a concept is disclosed in the U.S. Pat. No. 2,788,434. This solution suffers the rather critical disadvantage of the two legs of the stud being separated by a weak insulator between the two legs which seriously reduces the strength of the stud.

Another solution tried was to vary the geometry of the ends of the double ended stud by utilizing such configurations as chisel points as well as other configurations such as pointed ends, rounded ends and square ends. In some cases, fluxes were used to help lower the ionization potential and provide a shielding atmosphere. The use of differing stud end configurations and fluxes did not prove successful. In a few cases, two arcs would occur at the two legs. However, one arc was always larger than the other. The smaller arc usually produced no melting of either the stud or the base plate. The lighter arc generally became nothing more than a brief spark which caused slight heating of the stud and the base plate. The utilization of fluxes aided slightly in the process but still did not result in sound commercially acceptable welds. Even compounds that exhibit lower ionization potential and high electroconductivity than iron, although aiding in establishing arcs on both stud legs, did not effectively and consistently initiate the required dual arcs.

Another approach which has been investigated but found unsuccessful for double ended stud welding is that based upon the principles of arc gap effect and arc initiation and thermal emissivity at elevated temperatures. In this approach, the hypothesis is that, if the arc could be briefly extinguished on the operating leg by removal of the welding power, then the arc could be reignited on the opposite leg by virtue of that being the shortest arc path. It was postulated that, in order for the shorter path effect to dominate, the time that the arc was extinguished would have to be sufficient to allow a complete dissipation of the electron cloud and for the arc atmosphere to cool below levels where thermal ignition effects dominate.

In this approach, the power supply providing the welding current to the double ended welding stud was operated through a controller in a manner such that the welding current was rapidly turned on and off to the welding stud in bursts of energy spaced one from another in the order of 100 milliseconds. In some instances, dual arcing at both legs of the double ended stud were achieved. However, control of positioning the stud with respect to the workpiece was extremely delicate and difficult and the control of the arcing between the two legs was erratic and generally unsatisfactory welds resulted.

SUMMARY OF INVENTION

The foregoing problems encountered in welding of studs having two or more ends by the stud end welding technique are overcome by the studs, methods and apparatus as hereinafter described.

In accordance with the present invention, the welding ends of the multiended stud are modified to include at least one elongate relatively thin projection or wire of uniform cross-section transverse to the longitudinal axis thereof extending from each welding end of the stud. In larger studs, two or more projections or wires can be employed for each stud end.

The stud welding apparatus includes a chuck for securing the stud which is of configuration complementary to the upper portion of the double ended stud. The chuck maintains the welding stud in proper orientation with respect to the weld base in order that the projections will strike the weld base essentially simultaneously. The welding apparatus further includes a welding gun footpiece which secures two arc shields properly in place in alignment with the welding ends of the double ended stud.

There are four methods that can be employed in double end welding each of which employs a projection or projections 1/16" in diameter or greater by 1/16" long or longer or conical in nature.

One method entails holding the stud away from the work surface, establishing a welding voltage between the stud and the work then advancing the stud toward the work until the projection or projections contact the work whereby arcs are established between both stud ends and the work and then continue the forward motion of the stud until contact between stud end and work occur extinguishing the arcs.

A second method is similar except that when contact occurs and arcing begins, the resultant current flow in the circuit energizes a current relay which actuates a circuit to stop the forward motion of the stud for a time suitable to provide adequate melting of stud and work and then plunging the stud into the molten pool completing the weld.

A third method is to initially contact the stud projection or projections with the work under sufficient pressure to insure contact then connecting them to a source of welding power, creating an arc between both ends of the stud and the work, and then advancing the stud to the work at a controlled rate until contact between stud and work is made thus completing the weld.

A fourth method is similar to the third except that when the arcs between the stud ends and the work is initiated, the stud is held immobile for a predetermined time then plunged into the molten pool completing the weld.

The welding power supply utilized is a continuous current welding supply. The welding power supply is operated in a manner to provide welding current density across the welding tip projections or wires of a density sufficient to disintegrate each projection permitting consequent arc initiation. The relatively thin projection assures arc initiation at both legs of the double ended stud. Both arcs are maintained through high current densities while the stud is lowered into the resulting molten pools whereupon the arc is extinguished and the current switched off.

Other features, advantages and variations of the studs, apparatus and methods of multiended stud welding of the present invention will become apparent to those skilled in the art from the detailed description thereof which follows taken in conjunction with the drawing.

DETAILED DESCRIPTION OF DRAWING

FIG. 1 is a perspective view, partially in section, of a double ended shear connector in accordance with the present invention welded in place in conjunction with a supporting member and concrete slab;

FIG. 2 is an elevational view of a double ended shear connector in accordance with the present invention;

FIG. 3 is a perspective view of a portion of the welding apparatus, shear connector and arc shields prior to welding in accordance with the present invention; and FIG. 4 is a perspective view of a portion of the welding apparatus and shear connector following welding thereof.

DETAILED DESCRIPTION OF INVENTION

The foregoing detailed description of the studs, methods and apparatus for welding studs by the stud end welding technique wherein the studs have two or more ends to be simultaneously welded will be undertaken in respect to a double ended stud of the double ended shear connector type essentially as shown in FIGS. 1 and 2. However, it is to be understood that the present method and apparatus applies to and may be utilized in the welding of other configurations of studs as well as studs having more than two ends to be welded.

A double ended stud of a configuration suitable for use as a double ended shear connector is shown in FIGS. 1 and 2 of the drawing. The double ended stud 10 is shown utilized as a shear connector and is shown in FIG. 1 welded in place upon an I-beam 11.

In use, the stud 10 is welded to the I-beam 11 directly upon the I-beam or, in some instances, through decking 12 which is utilized as the bottom form member and projection for a concrete slab to ultimately be poured upon and supported by the I-beam 11.

A shear connector 10, welded in place, is shown partially embedded in a slab of concrete 13 as it would appear in actual use. The shear connector 10 provides an interconnection between the I-beam 11 and the slab 13 to resist shearing action of the concrete slab 13 in respect to the supporting beam 11 in a heretofore known manner.

The details of the shear connector design of double ended stud of the present invention is shown in FIG. 2 of the drawing. The shear connector stud 10 includes two weld ends 14 and 15. The ends 14 and 15 of the stud are disposed in a common plane.

A pair of stud legs or portions 16 and 17 of the stud adjacent each end 14 and 15 thereof are formed straight. This straight leg or portion is disposed generally perpendicular to the weld base upon which the stud is to be welded and is necessary for cooperation with the configuration of the arc shields which are used in the process and which will be described hereinafter.

The remainder of the stud 10 includes a stud body 18 disposed between the legs 16 and 17 may be of differing configurations from flat to U-shaped. In a preferred embodiment, the stud body is of a parabolic configuration.

The parabolic configuration of the remaining portion or body 18 of the stud provides for ready orientation of the stud in a stud welding chuck due to the noncircular configuration of the parabolic curve. Additionally, the parabolic configuration is of a shorter profile than a circular configuration and results in a material savings of approximately 17% to 25% over a circular configuration of the same height without distracting from the shear strength capabilities of the stud.

The cross section of the stud 10 may be of any desired configuration, i.e. round, eliptical or rectangular. In a preferred embodiment, the stud is of rectangular configuration as shown in FIGS. 1 and 2 of the drawing.

The weld ends 14 and 15 of the stud 10 are provided with elongate relatively thin projections or wires 19 extending parallel to the longitudinal axis of the legs and perpendicularly from the weld face of the weld ends 14 and 15 and thus, extend perpendicular to the weld base upon which the stud is to be welded. The projections or wires 19 may be formed of the parent metal of the stud during manufacture of the stud.

Alternately, the projections or wires may be affixed to the stud by any suitable means such as staking or welding. The projections or wires may be formed of a mild steel material such as the welding stud 10 itself or medium carbon or stainless steel.

The length of the projections 19 depends upon the configuration and general weld area of the end of the stud to be welded. In smaller diameter or cross sectional area studs, a projection of approximately 1/16 inch or greater is acceptable. In studs of larger cross sectional area, the length of the projections 19 will range up to approximately ½ inch. The cross sectional configuration of the projection 19 may be of any desired configuration such as circular or rectangular. By way of example, the cross sectional configuration of a rectangular projection may be in the area of 3/16 inch square down to the range of approximately 1/16 inch square or the equivalent cross sectional area in a round cross sectional configuration.

The welding gun apparatus including the stud chuck and the weld gun footpiece utilized in accordance with the present invention are shown in FIGS. 3 and 4 of the drawing. The welding gun 20 utilized may be generally of the hand held type utilized for welding of conventional shear connectors. Such a welding gun includes two legs 21 extending from the welding gun and which provide the support for a footpiece 22.

The footpiece 22 provides the support for two arc shields 23. The arc shields 23 have an internal configuration complementary to the configuration of the stud 10 to be welded. In the embodiment shown, the arc shields 23 are of a rectangular configuration.

The arc shields 23 are designed to fit into receptacles 24 in the footpiece 22 in the manner shown in FIG. 4 of the drawing. A relieved section 25 on the arc shields permits the upper portion 26 of the arc shield to fit into the receptacles 24 of the footpiece 22 with the lower portion of the arc shields projecting underneath the footpiece 22. In this manner, when the footpiece is placed in welding position, the arc shields are held in place between the footpiece and the workpiece as essentially shown in FIG. 4 of the drawing.

The welding gun chuck 27 of the apparatus of the present invention includes a backing plate 31 which is secured at its upper central portion to the gun extension rod 28 by means of a conventional threaded arrangement. The inside configuration of the backing plate 31 is of a configuration complementary to the outside configuration of the upper portion of stud 10 to be utilized with the chuck.

Two chuck jaws 29 are disposed on either side of the backing plate 31. Either or both of the chuck jaws may be secured to the backing plate 31 by means of yieldable threaded fastener-spring arrangements 32. The width of the backing plate 31 is slightly less than the width of the stud 10 to be utilized in the chuck. The yieldable spring-threaded fastener arrangements 32 thus provide the yield of the chuck jaws 29 to permit snug fit of the stud 10 within the backing plate and chuck jaws when placed in welding position.

The stud 10 is loaded into the chuck assembly 27 upwardly through the opening in the footpiece and into the chuck assembly. The complementary configuration of the inner surface of the backing plate 31 will permit proper alignment of the stud within the chuck and in respect to the weld base upon which the stud is to be welded in all cases where the stud 10 is not of a complete circular configuration. In the particular embodiment shown, the body or upper portion 18 of the stud 10 is of a parabolic configuration which provides for ready orientation of the stud means 14 and 15 and projections 19 perpendicular to the weld base and the extremities of the projections 19 being disposed in a plane parallel to the weld base.

An alignment pin 33 may also be used to insure proper alignment of the stud 10 with respect to the workpiece. The alignment pin 33 is secured at its one end axially to the extension rod 28. The alignment pin 33 extends downwardly below the backing plate 31 and is adapted to cooperate with an alignment aperture 34 formed into the stud 10 as shown in FIGS. 2 and 3. The length of the alignment pin 33 is such that the lower end of the alignment pin 33 will mate with the aperture 34 in the stud as the stud is being inserted upwardly through the footpiece into the chuck 27.

Prior to welding, the stud 10 is inserted through the footpiece into the chuck 27. The arc shields 23 are positioned in place within the footpiece and the entire assembly is then placed in position for welding as shown in FIG. 4 of the drawing.

In one embodiment, the stud welding gun 20 includes a lift solenoid which will retract the extension rod 28 to position the stud projection above the workpiece. The lift mechanism of the gun is also designed such that the extension rod is biased toward the workpiece. An extension rod locking mechanism is also provided which is capable of locking the extension rod at any position upon application of a control signal to the locking mechanism, i.e. when the projections come into contact with the workpiece.

The stud welding gun may also include an extension rod damper which is variable in nature and may be adjusted to control the rate of plunge between ¼ to 3 inches per second.

The extension rod biasing means may be of different spring rates. In one embodiment, the spring pressure is approximately 40 pounds upon the chuck.

The stud welding gun of the present invention, depending upon the embodiments utilized, permits four different welding methods.

The first welding method utilizes the lift solenoid and the biasing spring of 40 pounds pressure. The stud is retracted, stud energized and stud plunged. Upon the stud tips contacting the workpiece, arc initiation occurs. The extension rod biasing means urges the stud toward the workpiece until contact of the stud ends and workpiece extinguish the arcs.

In the second method, the extension rod locking mechanism is included along with the lift solenoid. When the energized stud tips contact the workpiece, this is sensed and the locking mechanism energized for a time suitable to provide adequate melting of the stud and workpiece. Thereafter, the extension rod biasing means plunges the stud into the molten pool completing the weld.

In the third method, the gun lift solenoid is not used but the gun includes the extension rod damper, and extension rod biasing means. The stud tips are engaged with the workpiece and the stud energized to initiate arcing. The stud is advanced toward the workpiece at a controlled rate under control of the extension rod damper until contact between the stud and workpiece extinguishing the arcs.

In the fourth method, the extension rod biasing means and extension rod locking means are used without the lift solenoid. The stud tips are engaged with the workpiece and the stud locking mechanism engaged. After the stud is energized, the locking mechanism holds the stud immobile for a predetermined time after which the stud is plunged into the molten pool extinguishing the arcs.

The current density drawn from the welding power supply is selected for the particular projection configuration and method being utilized to permit the current density in the projections to be sufficiently high to cause disintegration or explosion of the projection in 5–10 milliseconds. This current density is significantly higher than that experienced in normal drawn arc stud welding which essentially provides only an arc without particular disintegration of the end of the stud being welded. However, the weld current density is controlled at a level significantly below that of the capacitor discharge welding which essentially causes almost instantaneous destruction of the entire smaller welding tip associated with the conventional capacitor discharge studs.

By way of example, with a stud having an approximate 1/16 by 1/16 inch square projection cross section, the power supply may be set to deliver approximately 3,500 amps. Under this condition, the current density experienced in the projection on the stud will be in the order of 1,000,000 amps per square inch. This is approximately 1/10 of the current density experienced in a typical capacitor discharge welding cycle but 200 times the current density experienced in a typical arc stud welding cycle.

The control of the pressure upon the stud, the rate of plunge and the current density must be maintained all in proportion and ratio to one another and to the projection configuration to provide for arc initiation. All of these factors are matters which can be ascertained for given stud and welding projection configurations.

The welding controller may be calibrated to time-out and discontinue the welding current slightly before, at or after the stud ends reach the workpiece. In a preferred embodiment, the weld current is maintained on after the stud reaches the workpiece for a slight duration of time, which procedure is known as a hot plunge.

The welding time between the moment of contact of the projections of the stud and the discontinuance of welding current depends upon the length and cross sectional area of the projections as well as the current setting. By way of example, a projection of ⅛ inch in length and of approximately 1/16 inch square configuration results in a welding cycle time of between 0.2 to 0.3 seconds. When a ½ inch length projection is utilized with a 1/16 inch square cross sectional projection, the welding cycle is from approximately 0.4 to 0.6 of a second. By way of comparison, the welding cycle time of conventional capacitor discharge welding is 0.002 to 0.004 seconds while conventional drawn arc stud welding is 0.100 seconds or greater.

In a preferred embodiment, a positive ground connection to the workpiece is preferred. Under these circumstances as above described, it is found that the base metal contributes to a major portion of the weld joint with a lesser portion of the weld fillet material being formed from the stud.

From the foregoing description of a preferred embodiment of the double ended stud welding stud, apparatus and methods in accordance with the present invention, it will be appreciated that the apparatus and method as well as the stud described provide an effective and reliable method for effecting simultaneous welding of a stud having two or more weld ends by the stud end welding technique. The description of specific embodiments and parameters has been made by way of illustration and not by way of limitation and the scope of the invention is to be interpreted in view of the following claims.

What is claimed is:

1. The method of simultaneously stud welding the ends of a multi-ended metallic stud to a metallic base member comprising the steps of:
    providing on each end of the stud at least one elongate relatively thin metallic extending projection;
    applying a controlled pressure upon the stud in the direction of the base member;
    applying an electrical potential to the stud from a continuous current power supply;
    bringing the metallic projections into contact with the metallic base member; and
    controlling the pressure on and the rate of advance of the stud toward the workpiece and controlling the electrical potential upon the stud all in proportion to one another and to the configuration of the projections and stud ends to (1) provide a current density in the projections to essentially immediately and simultaneously disintegrate the projections to establish arc initiation at all ends of the metallic stud and (2) thereafter maintain a continuous arc at all ends of the metallic stud of duration and current density at least equaling that of drawn arc stud welding to maintain molten metal at each end thereof until the ends of the stud come into contact with the base material.

2. The method of claim 1 further including the steps of:
    positioning the stud and projections in contact with the base material at the initiation of the stud welding cycle and holding the stud at that position for a predetermined time then plunging the stud under control into the resultant molten pools.

3. The method in claim 1 further including the steps of positioning the stud and projections in contact with the base material at the initiation of the stud welding cycle and allowing the stud to arc during the controlled plunge time into the resultant molten pools.

4. The method in claim 1 including the steps of positioning the stud and projections out of contact with the base material at the initiation of the stud welding cycle and energizing the stud prior to contact with the base material.

5. The method of claim 1 further including the step of:
    maintaining the stud energized through contact of the stud end with the base material.

6. The method of claim 1 wherein the current density in the projections is approximately 200 times the typical drawn arc stud welding current density and 1/10 the typical capacitor discharge stud welding current density.

7. The method according to claim 1 in which the current density in the projections is in the order of one million amperes per square inch.

8. The method of claim 1 further including the steps of positioning the stud and projections out of contact with the base material and energizing the stud prior to contact with the base material and, upon contact of the projections with the base material, locking the stud against further descent toward the base material for a predetermined time and then permitting the stud to continue its descent into contact with the base material.

9. The method of claim 1 wherein the rate of descent of the stud toward the workpiece during the welding cycle is maintained within the range of approximately 1/4 inch per second to 3 inches per second.

10. The method of claim 1 wherein the amperage in the stud projections is of such density to disintegrate the projections in the range of 0.005 to 0.010 seconds and the remaining welding cycle time is within the range of 0.200 to 0.600 seconds.

11. A stud adapted to be welded to a metallic base member by the stud end welding technique comprising:
an electrically conductive stud body;
a plurality of electrically conductive stud legs extending from the stud body and terminating in stud ends;
at least one elongate relatively thin electrically conductive projection of generally uniform cross section extending from each stud end in a direction parallel to the longitudinal axis of each stud leg and being of equal length and terminating in a common plane; and
wherein the cross section of each projection transverse to the longitudinal axis thereof is in the range of 1/16 square inches to 3/16 square inches.

12. A stud adapted to be welded to a metallic base member by the stud end welding technique comprising:
an electrically conductive stud body;
a plurality of electrically conductive stud legs extending from the stud body and terminating in stud ends;
at least one elongate relatively thin electrically conductive projection of generally uniform cross section extending from each stud end in a direction parallel to the longitudinal axis of each stud leg and being of equal length and terminating in a common plane; and
wherein each projection is of length in the range of 1/16 inches to 1/2 inches.

13. The stud of claim 12 wherein the cross section of each projection transverse to the longitudinal axis thereof is in the range of 1/16 square inches to 3/16 square inches.

14. A stud adapted to be welded to a metallic base member by the stud end welding technique comprising:
an electric conductive stud body having two electrically conductive stud legs extending from the stud body forming a double ended stud terminating in stud ends disposed in a common plane wherein a portion of the stud body is of parabolic configuration to permit stud alignment with a stud chuck; and
at least one elongate relatively thin electrically conductive projection of generally uniform cross section transverse to the longitudinal axis thereof extending from each stud end.

15. A stud adapted to be welded to a metallic base member by the stud end welding technique comprising:
an electrically conductive stud body having two electrically conductive stud legs forming a double ended stud wherein both legs of the stud are disposed in a common plane;
at least one elongate relatively thin electrically conductive projection of generally uniform cross section extending from each stud end; and
alignment means formed into the stud body providing alignment with a stud chuck.

* * * * *